UNITED STATES PATENT OFFICE.

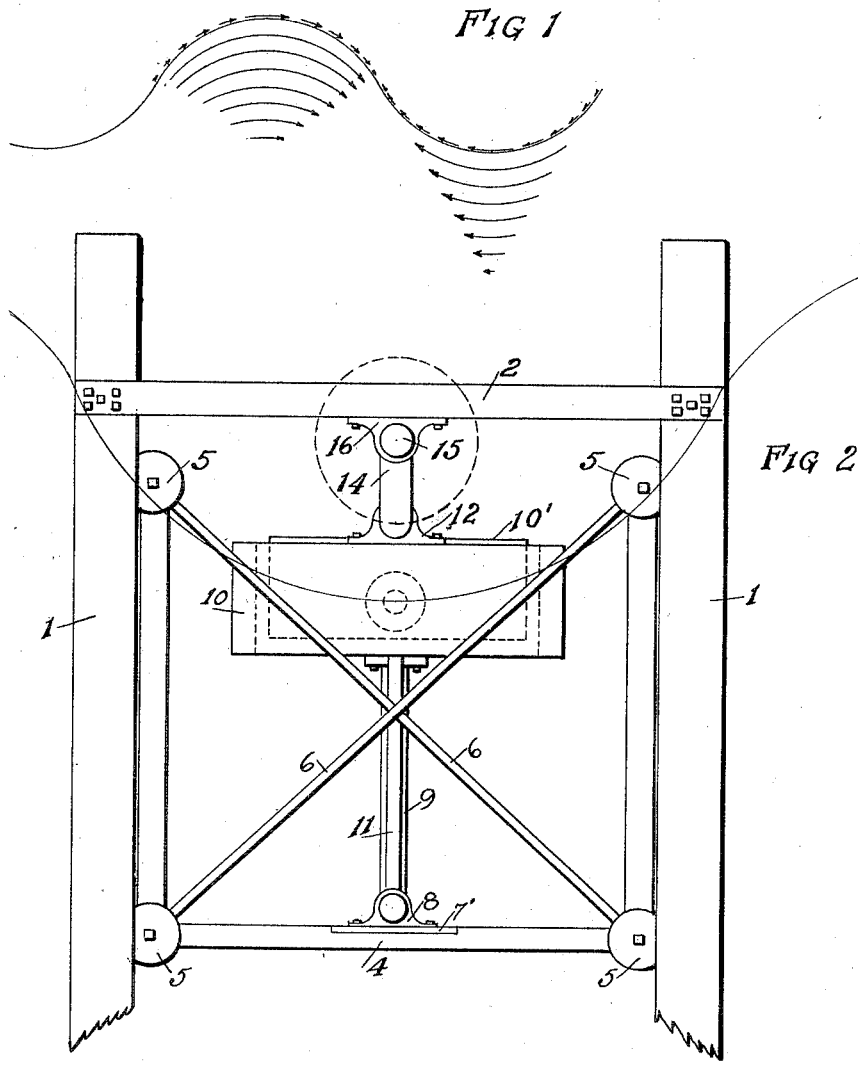

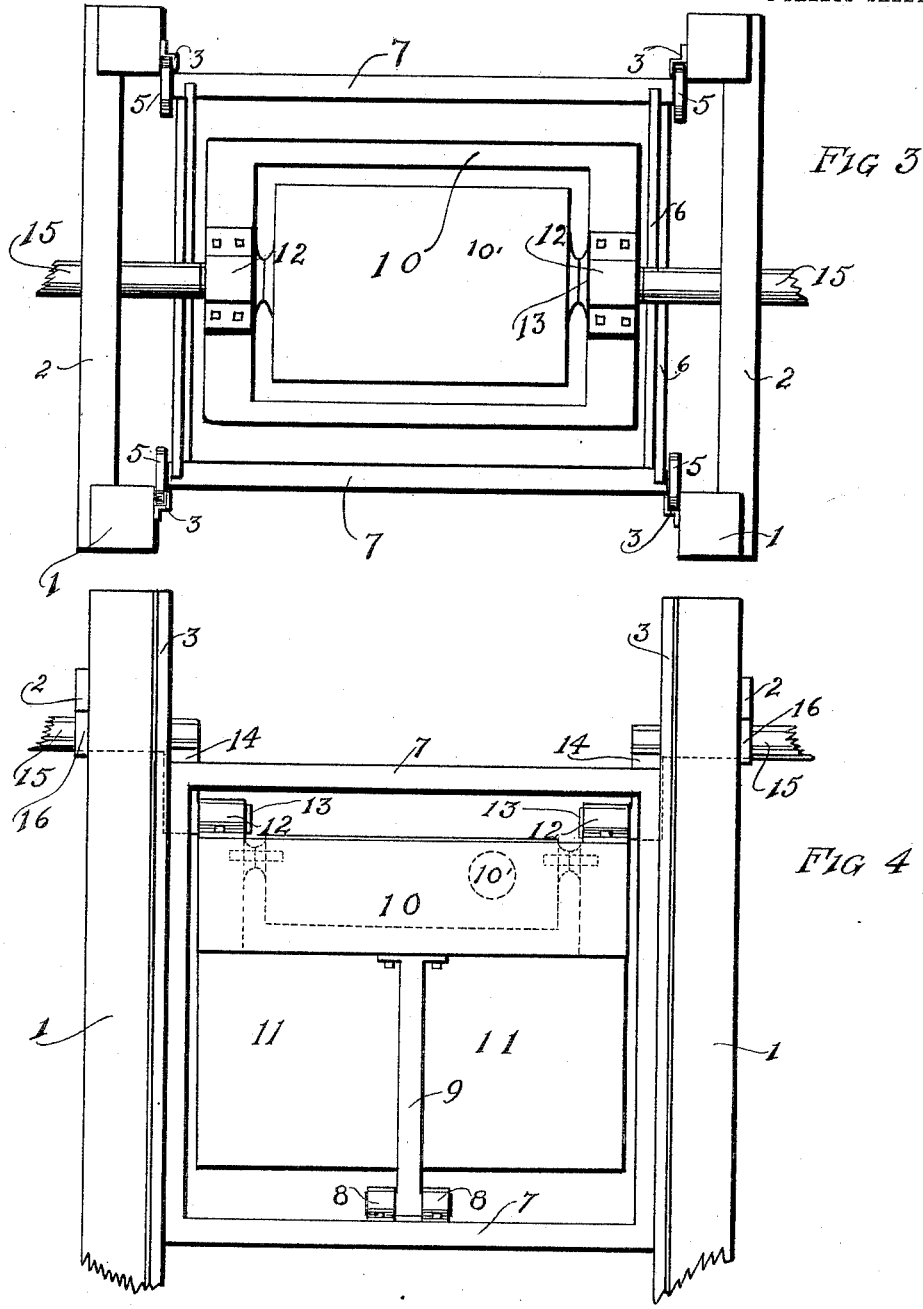

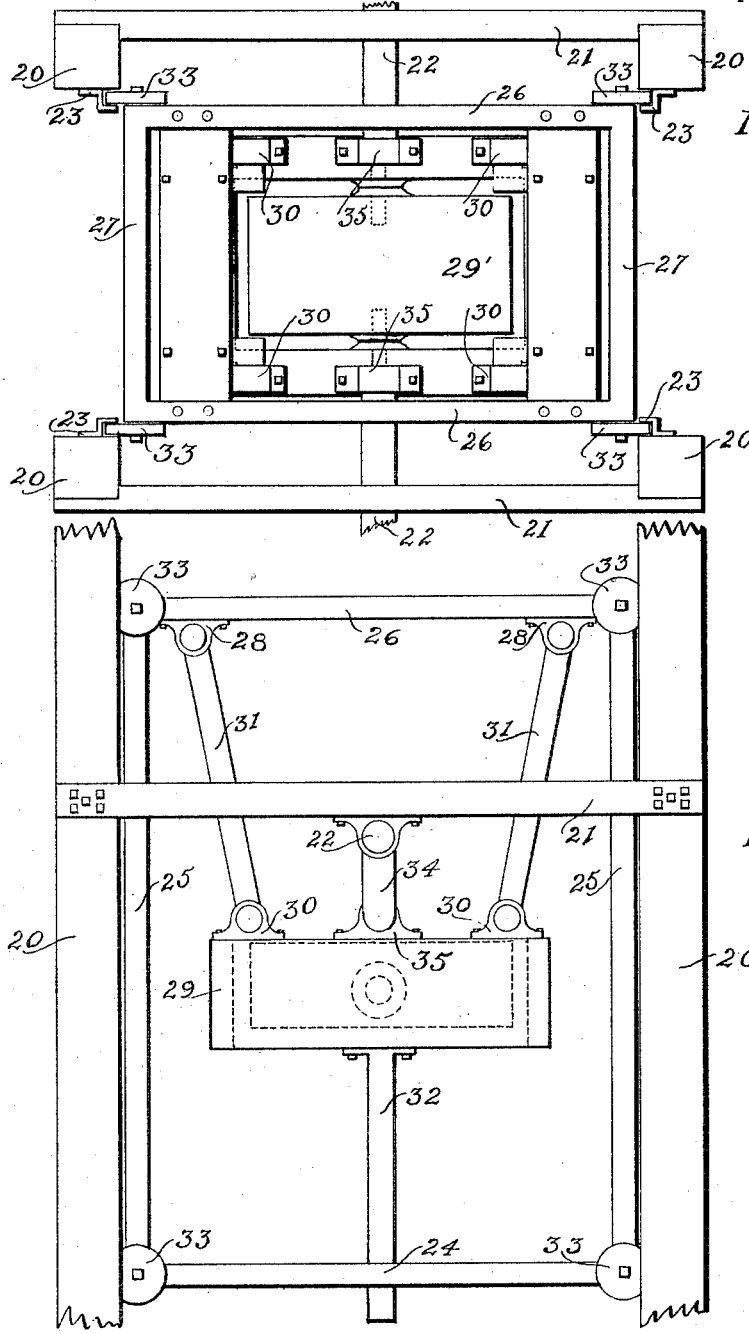

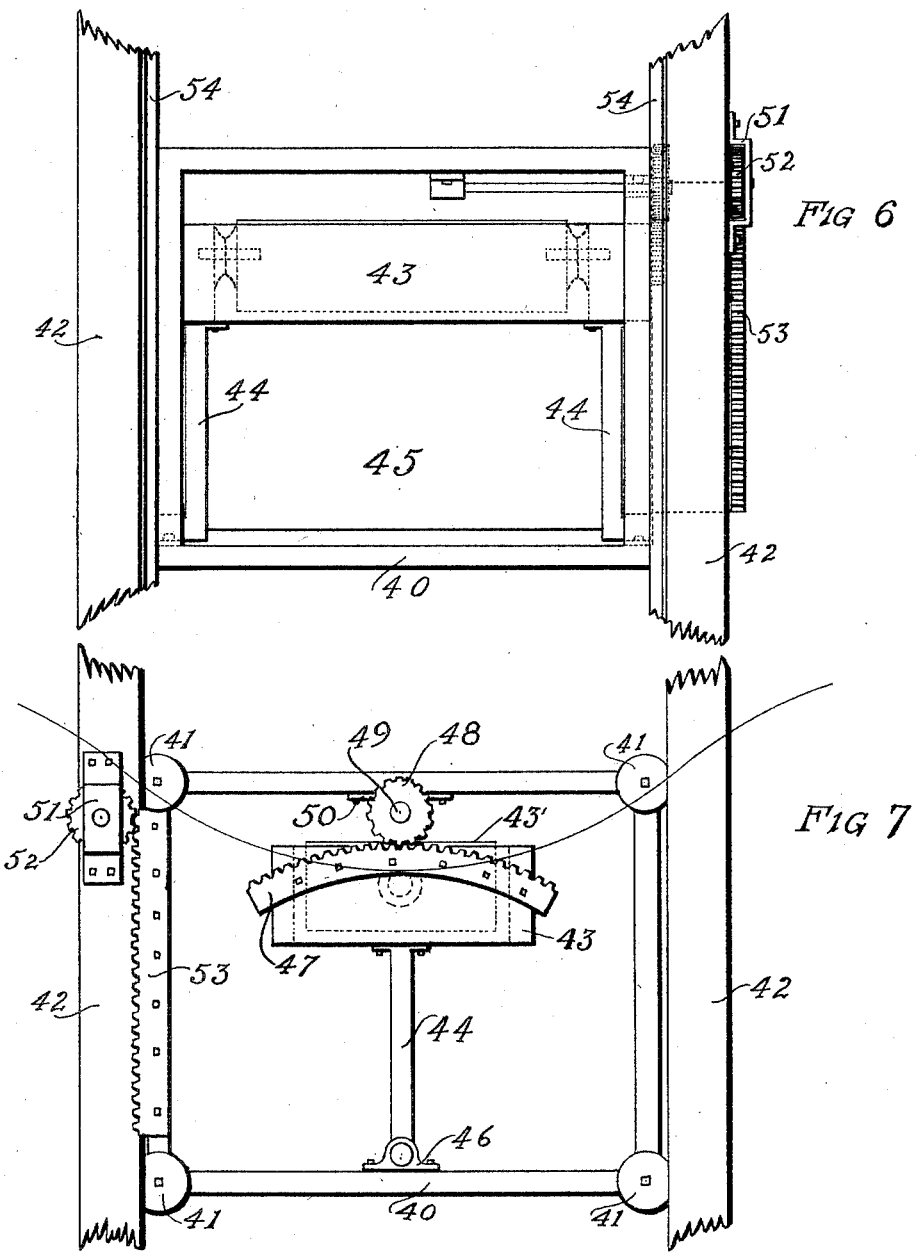

BENNET CARROLL SHIPMAN, OF SAN FRANCISCO, CALIFORNIA, ASSIGNOR TO PACIFIC WAVE POWER COMPANY, OF SAN FRANCISCO, CALIFORNIA, A CORPORATION OF CALIFORNIA.

WAVE-MOTOR.

1,076,844. Specification of Letters Patent. Patented Oct. 28, 1913.

Application filed December 27, 1910, Serial No. 599,404. Renewed March 25, 1913. Serial No. 756,798.

*To all whom it may concern:*

Be it known that I, BENNET CARROLL SHIPMAN, a citizen of the United States, residing at San Francisco, in the county of San Francisco and State of California, have invented a new and useful Wave-Motor, of which the following is a specification in such full and clear terms as will enable those skilled in the art to construct and use the same.

The object of this invention is to make use of all of the motion of water in waves for the generation of power therefrom.

Heretofore it has been proposed to utilize the up and down motion of the waves, or the to and fro motion, either in the wave or in the surf, in such a manner as to secure but a portion of the energy available in the waves. It will be understood by those familiar with the dynamics of waves that the water in wave motion is subject to two distinctly different movements; that is to say, in the complete cycle of each wave there is an up and down movement of the water, and in addition thereto there is a to and fro movement of the water in quadrature relation to the other movement, the two combining to produce a true rotary movement. In deep water waves, where the depth of water is equal to or greater than the wave length this rotary motion is practically circular, but becomes more and more elliptical, with the long axis vertical, as the wave reaches shallower water, due to the greater retarding effect of the sea bottom on the motion of the water in the trough of the wave. Finally the forward motion on the crest overruns the backward motion in the trough and the wave breaks in the familiar effect of surf. It is evident, therefore, that the maximum energy of waves exists in deep water, and that this energy is gradually lost as the wave approaches shore, until it is all dissipated by the surf in the form of heat.

My invention is therefore intended to be operated in relatively deep water, abstracting from the waves practically the total energy contained.

In Figure 1 the movement of the water in the crest and the trough of a deep water wave is illustrated by means of curved arrows. The small arrows of varying length above the water surface may represent the relative velocity and direction of a particle of water at any given location of said particle on the surface of the wave, and the diminishing curved arrows below the water surface may represent the relative diminution of such velocities as depth is reached, until finally a point is arrived at where there is no motion to the water. That is to say, in the upper half, herein called the crest, of a wave the particles of water are traveling in the direction of the wave propagation at velocities varying from nothing at the start of the crest to maximum at the middle of the crest and again to nothing at the end of the crest. These varying velocities are greatest at the surface and decrease downwardly to a point dependent upon the magnitude of the wave. The maximum velocity in each stratum of the water, wherever that stratum may be located, occurs at the middle of the crest. In an exactly similar manner the movement of the water in the lower half, herein called the trough, of the wave is opposite to the wave propagation, is greatest at the surface of the water, and varies also from nothing at the start of the trough to a maximum at the middle and again to nothing at the end. These varying velocities similarly also are greatest at the surface of the water, and decrease downwardly to a point dependent on the magnitude of the wave, below which the water is quiescent. It will therefore be apparent, if we consider a body floating in the waves, that it is first moving a certain amount in one direction and then an equal amount in the opposite direction, while at the same time it is moving vertically first up and then down an amount equal to the height of the wave between trough and crest at their maximum, so that such a body describes a true rotary path and returns to its initial position with the passage of each wave, if not acted on by any other force than that of the wave. Hence, to obtain the complete energy of the wave, it is necessary to provide an apparatus adapted to utilize both the to and fro and the up and down movements of the water to the best advantage.

From the above exposition it is evident that the movement of the water in a wave virtually takes place about some point under the surface, like a center, and any apparatus to utilize this movement most effectively must move similarly. But such a virtual center is not fixed in space, being lower down for the trough of the wave than for the crest. Its locus, however, at any given spot is a vertical line, so that a vane arranged to move about a suitable center, which center is adapted to move vertically can be made to abstract the total energy of the to and fro movement of the water, while a properly arranged float suitably attached to said vane can be made to abstract the total energy of the up and down movement of the water. It is also to be noted that unless the center of movement of the float frame and vane is below the surface of the water that undesirable strains will be set up in the apparatus in addition to the loss of power.

In the drawings of the apparatus, in which the same numeral of reference is applied to the same portion throughout the several views, Fig. 1 is a side elevation of a conventional wave illustrating the motion of the water by means of curved arrows. Fig. 2 is an end elevation of one form of the wave motor; Fig. 3 is a plan view of the motor shown in Fig. 2; Fig. 4 is a side elevation of the motor shown in Fig. 2; Fig. 5 is a plan view of a modified form of the invention in which the sliding frame is supported from links extending above the float frame; Fig. 5^A is an end elevation of the motor shown in plan in Fig. 5; Fig. 6 is a side elevation of a motor similar to that shown in Fig. 2, save that means are provided to take off power in two separate components; and Fig. 7 is an end view of the motor shown in Fig. 6.

The numeral 1 represents a series of piles of suitable material and construction for the purpose intended. In the present instance four such piles are shown, as sufficient to set forth the invention, and they are connected in pairs by the cross girders 2. A track is provided, in this case a Z bar 3, on each pile, which forms the means whereby a cross head frame 4, is guided in its vertical movements up and down.

The cross head frame 4, is provided with eight wheels 5, in order to reduce friction, and is suitably braced by means of braces 6, and cross bars 7. Connecting the side bars at the bottom of the frame 4, there is a bar 7', which supports two bearing boxes 8. These bearing boxes 8 have a heavy member 9, journaled therein, and said member is connected at its upper end to a float frame 10. In the said float frame, there is supported a float 10', of suitable dimensions and pivoted to the float frame at opposite ends. The object of pivoting the float to the frame 10 is to permit it to oscillate about an axis parallel to the wave front, while at the same time it moves the float frame up or down as the wave rises or falls. The float frame has a depending vane 11, on each side of the member 9, said vane extending downwardly into proximity to the box 8, so that the said vane 11, will move the float frame to and fro as the water moves horizontally. The float frame carries two journal boxes 12, shown in this case on its upper side, and in said boxes are journaled the crank pins 13, of the cranks 14. The cranks 14 are each formed on the end of a shaft 15, each of the latter shafts being journaled in boxes 16, secured to the under side of the girder 2.

The operation of this form of the invention is as follows: The wave crest is that portion of the wave which rises above the mean level, while the trough is that portion below the mean level. When a wave passes the float 10', its crest causes the float and float frame to move in the direction of the wave propagation with a gradually increasing horizontal velocity. At the same time the float frame first ascends with a gradually decreasing vertical velocity until the top of the crest is reached, when the horizontal motion is a maximum and the vertical motion is nothing, and then moves in the same horizontal direction with a gradually decreasing velocity and descends with an increasing vertical velocity until the crest of the wave has passed. At the junction of the crest and trough, the horizontal motion is nothing and the vertical downward motion is a maximum. The succeeding trough of the wave causes the float and float frame to move in the opposite direction horizontally with gradually increasing velocity and to continue the descent with gradually decreasing vertical velocity, until the bottom of the trough is reached, when the horizontal motion is again a maximum, in a reverse direction and the vertical motion is nothing. The movement then continues in the same horizontal direction with a gradually decreasing velocity and the float frame ascends with a gradually increasing vertical velocity until the trough of the wave has passed, when the horizontal motion is nothing and the vertical upward motion is a maximum, and the float and the float frame have returned to their initial position, and the oncoming crest of another wave is ready to repeat the cycle of operations. The combination of the two movements described in this inversely coördinated relation, in circular waves is expressed by the formula $$\sqrt{\sin.^2 a + \cos.^2 a} = R$$

results in the float and float frame describing a rotary path, and it thus drives each of the shafts 15, and any suitable mechanism connected therewith, in a continuous rotary manner.

It is to be noted that the cross head frame 4, changes its position in accordance with the requirements of the wave, so that the pivot pin of the bar 9, is automatically moved and is always at the proper location corresponding to the virtual center about which the water may be considered to be partially and alternately revolving. However, the above form of the invention necessarily locates the mechanical center of movement of the float frame below the surface of the water. A disadvantage of this form of construction is that an important journal bearing is made submerged, which is a bad mechanical arrangement for inspection and lubrication.

Figs. 5 and 5ᴬ illustrate a modified form of the invention, having suitable means for giving to the float and float frame substantially the same motion as that provided for in the first figures without the use of the undesirable submerged journal bearing. In these figures, the numeral 20 represents piling which guides the cross head frame. Stringers 21, connect two of the piles at each end of the float frame and form the support for the shafts 22. Secured to the side of each pile 20, is a track 23, which forms the guides for the cross head frame 24, to which frame is attached the float as in the previous form of the invention. The cross head frame 24, has uprights 25 at the sides, the said uprights being connected by the cross bars 26 at the top, and lateral cross bars 27 connect the two side frames. The cross bars 26 support journal boxes 28, while the float frame 29 is provided with similar journal boxes 30. Extending upwardly from the journal boxes 30 are links 31, two at each side of the center. Depending below the float frame, but rigidly attached to it, is a vane 32, and in the float frame suspended by pivots is a float 29' of suitable dimensions adapted to oscillate about an axis parallel to the wave front. In order that the frame 24, may move up and down with as little friction as possible, it is provided, as in the previous form, with eight rollers 33, which travel in the guides 23. The shafts 22, are each provided with a crank 34 journaled in boxes 35 on the float frame.

The result of supporting the float frame by four links, as shown, is that the to and fro movement of the float frame will cause it to assume the same angular position that it would assume if it were connected to a center below the surface of the water, as in the previously described arrangement, and were moved an equal amount to and fro. It furthermore has this advantage over the previous arrangement of allowing such a virtual center to be placed any distance down, which would be constructionally impossible otherwise. If the distance between the journal boxes of the upper end of the links 31, is the same as that between the boxes at the lower end of the links 31, a parallel motion of the float frame results, or in other words, the virtual center is at an infinite distance down. According as the ratio of the distance between the journal boxes at the lower ends of the links to that between the journal boxes at the upper ends of the links is made less the virtual center approaches the surface of the water. It is evident therefore that the vane 32, attached to the float frame at right angles therewith, always maintains a radial position from the virtual center below, about which the water partially revolves first in one direction and then in the opposite.

The result of compounding the to and fro motion imparted by the vane and the up and down motion imparted by the float will be to transform directly the rotary motion of the water in the waves into rotary motion of the shaft 22, in precisely the same manner as in the case of the form of the invention previously described.

Each of the previous forms of the invention are intended to completely transform the two force components present in quadrature in the moving water into rotary motion of a single shaft with a torque practically uniform with that of the wave and with the interposition of as little mechanism as possible. It is however possible to utilize these two force components separately, if desired, and Figs. 6 and 7 show a modification of the invention which is adapted to deliver these two components separately. In this form of the invention the supporting frame is substantially the same as that used in the previous forms of the invention. The cross head frame 40 is provided as before with eight anti-friction wheels 41, and it operates between guide piling 42. The float frame 43 has depending arms 44, pivoted at the bottom to the cross head frame 40, and between the two arms the vane 45 is attached at right angles to the float frame 43. The arms 44 are pivoted in boxes 46 above the bottom of the frame. On the side of the float frame, there is secured a segment rack 47, in mesh with a pinion 48 having a shaft 49 journaled in bearings 50 at the top of the frame 40. At the side of one of the piles there is supported a frame 51, which carries a shaft having a pinion 52 in mesh with a straight rack 53, said rack being suitably supported from the cross head 40. In this case as before, the float frame 43 incloses and is pivotally attached to a float 43' adapted to oscillate about an axis parallel to the line of the wave front. It will thus be observed that the up and down motion of the float will carry the cross head frame 40 along with it, and, as the frame rises and falls, the pinion 52 will be rotated, and from the shaft supporting the same, power may be delivered as desired. The to and fro movement of the water in the wave will cause a back and forth movement of the float frame about its center of movement, and this will cause the pinion 48 to rotate, and its shaft may also be used to deliver power, either independently or in conjunction with the other shaft. In this form of the invention the two components of the energy of the waves are separately transformed, and necessarily in an oscillatory manner, and with two dead points, or no motion, in each cycle of operation. For certain applications, however, this would not necessarily be an objection.

The invention as herein set forth necessitates a constant mean level of water, and a uniform wave height, and therefore would not be continuously operative in water subject to tides or variable waves. As I am making a separate application for Letters Patent on a suitable regulating mechanism for adjusting this invention automatically to the required level for tides, and a separate application for Letters Patent on a mechanism for adjusting this invention automatically for any wave height I make no claim herein for such regulating devices.

Having thus described my invention what I claim as new and desire to secure by Letters Patent of the United States is as follows:—

1. In a wave motor, a support, a shaft carried thereby, a float, a vane depending below said float, means whereby the center of motion of said float is caused to be below the surface of the water, and means connected with said float to operate said shaft, substantially as described.

2. In a wave motor, a support, a shaft carried thereby, a float, means to cause the center of motion of said float to be below the surface of the waves, a vane extending from the float toward said center of motion, and means whereby said float will cause said shaft to rotate, substantially as described.

3. In a wave motor, a support, a shaft carried thereby, a float, means whereby the center of motion of said float is caused to lie below the surface of the wave, a vane extending downwardly from the float, means to permit the float to assume a position substantially tangent to the wave elements touching the same, and means connected with said float to rotate said shaft, substantially as described.

4. In a wave motor, a support, a shaft carried thereby, a frame slidable vertically in said support, a float, means connected with said slidable frame to cause the center of motion of said float to lie below the surface of the water, and means whereby the motion of said float will cause the rotation of said shaft, substantially as described.

5. In a wave motor, a support, a shaft carried thereby, a frame vertically slidable in said support, a float, a frame to which said float is pivoted, a downwardly extending vane below said float, means to cause the center of motion of said float and vane to lie below the surface of the water, and means whereby the motion of said float will cause the rotation of said shaft, substantially as described.

6. In a wave motor, a support, a shaft carried thereby, a frame vertically slidable in said support, a secondary frame attached to said first frame so that its center of motion will lie below the surface of the water, a float pivoted to said secondary frame, a vane secured to the secondary frame and extending toward its center of motion, and means whereby the movement of the float will cause the rotation of the shaft, substantially as described.

7. In a wave motor, a support, a shaft carried thereby, a frame vertically slidable in said support, a secondary frame attached to said first frame so that its center of motion will lie below the surface of the water, a float pivoted to said secondary frame, a vane secured to the secondary frame and extending toward its center of motion, and means secured to the secondary frame for the rotation of the shaft upon the movement of the float, substantially as described.

8. In a wave motor, a support, a crank shaft carried thereby, a float, a vane depending below said float, means whereby the center of motion of said float is caused to lie below the surface of the water and means connected with said float to operate said crank shaft, substantially as described.

9. In a wave motor, a support, a crank shaft carried thereby, a float, means to cause the center of motion of said float to lie below the surface of the water, a vane extending below the float toward the center of motion of said float, and a journal box connected with the float and adapted to rotate said crank shaft upon the movement of the float, substantially as described.

10. In a wave motor, a support, a crank shaft carried thereby, a float, means whereby the center of motion of said float is caused to lie below the surface of the water, a vane extending downwardly from the float toward the center of motion thereof, means to permit the float to assume a position substantially tangent to the wave elements touching the same, and means connected with said float to rotate said crank shaft, substantially as described.

11. In a wave motor, a support, a crank shaft carried thereby, a frame vertically slidable in said support, a float, means connected with said slidable frame to cause the center of motion of said float to lie below the surface of the water, and means whereby the motion of said float will rotate said crank shaft, substantially as described.

12. In a wave motor, a support, a crank shaft carried thereby, a frame slidable vertically in said support, a secondary frame having the center of motion thereof below the surface of the water, a float pivoted to said secondary frame, and means whereby the motion of the float will cause the rotation of the crank shaft, substantially as described.

13. In a wave motor, a support, a crank shaft carried thereby, a frame vertically slidable in said support, a secondary frame attached to said slidable support so that its center of motion will lie below the surface of the water, a float pivoted to said secondary frame, a vane depending from the secondary frame, and means connecting the crank shaft and secondary frame to cause the rotation of the shaft upon the movement of the float, substantially as described.

14. In a wave motor, a support, a crank shaft carried thereby, a frame vertically slidable in said support, a secondary frame, oppositely inclined depending links connecting the two frames, a float pivoted to the secondary frame, a vane depending from the secondary frame, and means connecting the crank shaft and secondary frame whereby the shaft is rotated upon the movement of the float, substantially as described.

15. In a wave motor, a support, a crank shaft carried thereby, a vertically slidable frame in said support, a secondary frame, oppositely inclined links connecting the two frames, a vane depending from the secondary frame, a float pivoted to the secondary frame, a journal box on the secondary frame to which the crank pin of the crank shaft is connected whereby the crank shaft will be rotated upon the movement of the float, substantially as described.

In testimony whereof I have hereunto set my hand this 9" day of December A. D. 1910, in the presence of the two subscribed witnesses.

BENNET CARROLL SHIPMAN.

Witnesses:
C. P. GRIFFIN,
E. R. BLAKE.

---

Copies of this patent may be obtained for five cents each, by addressing the "Commissioner of Patents, Washington, D. C."